US012352080B2

(12) United States Patent
Basavarajappa

(10) Patent No.: US 12,352,080 B2
(45) Date of Patent: Jul. 8, 2025

(54) MOTOR-VEHICLE LOCK, IN PARTICULAR MOTOR-VEHICLE DOOR LOCK

(71) Applicant: KIEKERT AKTIENGESELLSCHAFT, Heiligenhaus (DE)

(72) Inventor: Madhu S. Basavarajappa, Leverkusen (DE)

(73) Assignee: Kiekert AG, Heiligenhaus (DE)

( * ) Notice: Subject to any disclaimer, the term of this patent is extended or adjusted under 35 U.S.C. 154(b) by 169 days.

(21) Appl. No.: 18/254,892

(22) PCT Filed: Dec. 13, 2021

(86) PCT No.: PCT/DE2021/000200
§ 371 (c)(1),
(2) Date: Jun. 13, 2023

(87) PCT Pub. No.: WO2022/127959
PCT Pub. Date: Jun. 23, 2022

(65) Prior Publication Data

US 2024/0060336 A1 Feb. 22, 2024

(30) Foreign Application Priority Data

Dec. 14, 2020 (DE) ..................... 10 2020 133 257.2

(51) Int. Cl.
*E05B 77/12* (2014.01)

(52) U.S. Cl.
CPC .................................... *E05B 77/12* (2013.01)

(58) Field of Classification Search
CPC .......... E05B 77/00; E05B 77/02; E05B 77/04; E05B 77/06; E05B 77/12; E05B 79/10;
(Continued)

(56) References Cited

U.S. PATENT DOCUMENTS 5,865,481 A * 2/1999 Buschmann ............ E05B 77/06
292/216
9,637,953 B2 * 5/2017 Bendel .................... E05B 77/06
(Continued)

FOREIGN PATENT DOCUMENTS

DE 202009009061 U1 * 1/2011 ............ E05B 77/06
DE 202016102209 U1 7/2017
(Continued)

OTHER PUBLICATIONS

International Search Report mailed May 2, 2022, for priority International Application No. PCT/DE2021/000200.

*Primary Examiner* — Nathan Cumar
(74) *Attorney, Agent, or Firm* — Renner, Otto, Boisselle & Sklar, LLP

(57) ABSTRACT

A motor-vehicle lock, in particular a motor-vehicle door lock, which is equipped with a locking mechanism made up substantially of a rotary latch and a safety catch. Also provided are at least one actuating lever and a release lever which, by means of a coupling element, can be engaged with one another in the at least one coupled position of said coupling element and can be disengaged from one another in the uncoupled position of the coupling element. Additionally provided is an inertia lever for forcing the coupling element into its uncoupled position at least in the event of a crash. According to the invention, depending on the design of the actuating lever, the coupling element can be moved in a controlled manner into a first coupled position and a second coupled position.

14 Claims, 6 Drawing Sheets

(58) Field of Classification Search
CPC ........ E05B 85/24; E05B 85/243; E05B 85/26; Y10T 292/108
USPC ........................................................ 70/101
See application file for complete search history.

(56) References Cited

U.S. PATENT DOCUMENTS

| | | | | |
|---|---|---|---|---|
| 9,845,624 | B2 * | 12/2017 | Erices | E05B 81/28 |
| 9,879,450 | B2 * | 1/2018 | Wahmann | E05B 77/06 |
| 10,113,341 | B2 * | 10/2018 | Erices | E05B 85/20 |
| 10,494,841 | B2 * | 12/2019 | Strathmann | E05B 79/10 |
| 11,072,947 | B2 | 7/2021 | Reddmann | |
| 2014/0284944 | A1 * | 9/2014 | Rosales | E05B 77/06 292/113 |
| 2017/0107743 | A1 * | 4/2017 | Topfer | E05B 77/38 |
| 2017/0152683 | A1 * | 6/2017 | Nagata | E05B 79/06 |
| 2018/0112441 | A1 * | 4/2018 | Damboiu | E05B 79/08 |
| 2018/0230715 | A1 * | 8/2018 | Ishiguro | E05B 77/06 |
| 2019/0003211 | A1 * | 1/2019 | Hunt | E05B 77/12 |
| 2019/0024418 | A1 * | 1/2019 | Pettengill | E05B 81/14 |
| 2019/0032373 | A1 * | 1/2019 | Taga | E05B 85/02 |
| 2019/0178011 | A1 * | 6/2019 | Fuchs | E05B 77/06 |
| 2019/0301208 | A1 * | 10/2019 | Cimpean | E05B 77/06 |

FOREIGN PATENT DOCUMENTS

| | | | | |
|---|---|---|---|---|
| DE | 102016124941 | A1 | 6/2018 | |
| DE | 102017102899 | A1 | 8/2018 | |
| WO | 2017076395 | A1 | 5/2017 | |
| WO | WO-2018225205 | A1 * | 12/2018 | E05B 77/06 |
| WO | 2020200361 | A1 | 10/2020 | |

* cited by examiner

MOTOR-VEHICLE LOCK, IN PARTICULAR MOTOR-VEHICLE DOOR LOCK

This application is a national phase of International Patent Application No. PCT/DE2021/000200 filed Dec. 13, 2021, which claims priority to German Patent Application No. 10 2020 133 257.2 filed Dec. 14, 2020, each of which is hereby incorporated herein by reference in its entirety.

FIELD OF DISCLOSURE

The invention relates to a motor-vehicle lock, in particular motor-vehicle door lock, comprising a locking mechanism made up substantially of a rotary latch and a safety catch, further comprising at least one actuating lever and a release lever which, by means of a coupling element, can be engaged with one another in the at least one coupled position of said coupling element and can be disengaged from one another in the uncoupled position of the coupling element, and comprising at least one inertia lever for forcing the coupling element into its uncoupled position at least in the event of a crash.

BACKGROUND OF DISCLOSURE

The actuating lever consequently operates on the actuating lever in the coupled state of the coupling element. As a result, a locking mechanism which is generally in the closed state can be opened by means of the actuating lever and in the coupled position of the coupling element, via the release lever. To this end, the release lever acts on a safety catch as a component of the locking mechanism, which is thereby lifted from its latching engagement with an associated rotary latch. However, if the coupling element is in its uncoupled position, then action on the actuation lever comes to nothing because an associated actuating lever chain is interrupted between the actuating lever and the release lever. The locking mechanism in the closed state remains in its closed functional position.

The inertia lever now ensures that the coupling element, in its coupled position, is uncoupled, specifically at least in the event of a crash. The crash situation corresponds to high accelerations or transverse accelerations of generally 5 g and more, so that an unintentional opening of the locking mechanism is prevented thereby. As a result, an associated motor-vehicle door remains closed and, in most cases, safety systems located in the motor-vehicle door, such as side impact protection or also side airbags, can take full effect in order to protect the motor-vehicle occupants.

For this purpose, in the category-defining prior art according to WO 2017/076395 A1, a control lever is provided in addition to the inertia lever, which cooperates with the inertia lever. In this case, the control lever is guided in a control contour of the inertia lever. This is intended to provide a defined control of the coupling behavior.

After the crash, it is important that the motor-vehicle lock and in particular the motor-vehicle door lock can be opened without problems. This should be possible as far as possible both from the inside, by possibly uninjured or slightly injured occupants, as well as from the outside for rescue personnel. At this point, this is often aggravated in practice in that individual or all motor-vehicle doors have been locked before the crash, and therefore possible problems can arise therefrom.

In the further prior art according to DE 20 2016 102 209 U1, a crash protection for a motor-vehicle door is described, which acts practically exclusively on the outer door handle. This is because a mounting for connecting a pulling element to actuate the motor-vehicle lock is provided by a door handle. A blocking of the pulling element is brought about with the aid of a crash element.

Finally, the further prior art according to DE 10 2016 124 941 A1 describes, inter alia, a crash lock comprising a locking device and a release device. The release device is equipped with a mechanical timer. As a result, after a predetermined time, an opening of a movable component of a motor-vehicle and in particular of a motor-vehicle door is made possible. This is a period of 1 to 5 seconds.

The prior art has proven itself in principle, but still offers room for improvement. In practice, situations can arise such that the inertia lever reliably transfers the coupling element into its uncoupled position during an accident or in the event of a crash, so that a for example crash-induced deflection of an outer door handle is not transmitted to the release lever. The locking mechanism remains closed, just like the associated motor-vehicle door. After the end of the crash process, the inertia lever returns to its starting position. Depending on whether, for example, a locking mechanism is also working on the coupling element, opening may, in some circumstances, subsequently be possible neither from the inside nor from the outside. Rather, such a locking mechanism requires that initially unlocking must take place. This is problematic in the case of injured occupants. The invention as a whole seeks to remedy this.

SUMMARY OF DISCLOSURE

The invention is based on the technical problem of developing such a motor-vehicle lock and in particular a motor-vehicle door lock in such a way that a particularly functional design is provided, which makes possible and provides a simple opening from the inside or from the outside after the event of a crash.

To solve this technical problem, a motor-vehicle lock, and in particular a motor-vehicle door lock, of the type in question is characterized within the scope of the invention in that the coupling element can be controlled in a first and a second coupled position, depending on the design of the actuating lever.

That is to say that, according to the invention, the coupling element can be transferred into at least two different coupled positions, namely into the first coupled uposition and the second coupled position. This makes it possible to differentiate with respect to the actuating lever. If, for example, the actuating lever is an internal actuating lever, the coupling element is controlled in the first coupled position in the example. This first coupled position may correspond to the internal actuating lever in question being continuously engaged with the release lever. In this case, the invention proceeds from the knowledge that, in the event of a crash, almost predominantly forces act on an outer door handle and consequently an associated external actuating lever, while the internal door handle and consequently also the internal actuating lever remain uninfluenced. This can essentially be attributed to the fact that a force direction acting on the internal door handle (in the event of a crash) acts in the closing direction of the motor-vehicle door, whereas the force direction and the opening direction coincide in the case of the external door handle.

As a result, in the example, the first coupled position can reflect this situation, namely that the internal door handle and with it the internal actuating lever are continuously engaged with the release lever, even in the event of a crash, so that motor-vehicle occupants can easily escape from the associated motor-vehicle after such an accident.

In contrast to this, in this first coupled position of the coupling element with regard to the external actuating lever, it is assumed that the latter, like the associated external door handle, does not engage with the release lever in the event of a crash. That is to say that the coupling element located in the first coupled position is acted upon in the event of a crash with the aid of the inertia lever in such a way that the external actuating lever is disengaged from the release lever.

As a rule, both an internal actuating lever and an external actuating lever are realized. In this case, the design is usually such that only the external actuating lever is disengaged from the release lever in the first coupled position of the coupling element and when the coupling element is acted upon by the inertia lever. In contrast, in this case, the internal actuating lever is still in engagement with the release lever in the first coupled position of the coupling element and when the coupling element is acted upon by the inertia lever. That is to say, the pivoting movement of the inertia lever associated with the event of a crash and typically observed comes to nothing in the first coupled position of the coupling element relative to the internal actuating lever. In contrast, in the case of a crash, the coupling element is acted upon in the first coupled position by means of the inertia lever in such a way that the external actuating lever is disengaged from the release lever.

In contrast, the second coupled position of the coupling element corresponds to the fact that, when the coupling element is acted upon by the inertia lever, neither the external actuating lever nor the internal actuating lever is disengaged from the release lever, because they already assume or have assumed such a disengagement position in the second coupled position of the coupling element. That is to say, in the second coupled position of the coupling element, in the event of a crash, a dead stroke of the inertia lever relative to the coupling element occurs.

A locking element is generally provided for actuating the coupling element in the first and second coupled position. In this case, the first coupled position corresponds to the "unlocked" position. In this unlocked position or the first coupled position of the coupling element, both the internal actuating lever and the external actuating lever are mechanically connected to the release lever. The same applies for the internal door handle and the external door handle. In order that the external door handle does not accidentally correspond to an opening of the associated motor-vehicle door in this first coupled position and the "unlocked" position of the coupling element in the event of a crash, the inertia lever ensures, in this first coupled position and when the coupling element is acted upon by the inertia lever, that only the external actuating lever is disengaged from the release lever. The internal door handle and with it the internal actuating lever, however, still remain in engagement with the release lever as before.

In contrast, the second coupled position of the coupling element corresponds to the "locked" position of the locking element. In this functional position, both the internal actuating lever and the external actuating lever are disengaged from the release lever. As a result, in the event of a crash, the inertia lever "fails" in relation to the coupling element, because neither of the actuating levers mentioned have a mechanical connection to the release lever.

The locking element controlling the coupling element is generally acted upon by a motor and/or manually. In the case of a motor-driven action, the locking element is typically equipped with a toothed ring and is designed as an actuating cam for the coupling element. This actuating cam has said toothed ring at its one end, and is connected at its other end to the coupling element in an articulated manner.

According to an advantageous embodiment, the coupling element is mounted on the release lever in a linearly displaceable manner. As a result, the different functional positions of the coupling element can be easily realized by a corresponding linear displacement on the release lever. In addition, the coupling element advantageously has an external actuating lever contour and an internal actuating lever contour. The external actuating lever contour is also usually realized on the head side of the coupling element. In contrast, the internal actuating lever contour is a pin adjoining the external actuating lever contour internally. A chamfer on the internal actuating lever can engage behind the pin, for interaction with the internal actuating lever.

The first coupled position of the coupling element being assumed now corresponds to the chamfer on the internal actuating lever being able to work on the pin. The external actuating lever is also able to travel against the head-side external actuating lever contour. If the crash now occurs, the coupling element located in the first coupled position is uncoupled with the aid of the inertia lever. This results in the external actuating lever contour being displaced out of the region of action of the external actuating lever, whereas the pin on the coupling element can interact unchanged with the chamfer on the internal actuating lever. In the second coupled position of the coupling element, neither the external actuating lever contour nor the pin are in the region of action of the external actuating lever or the internal actuating lever.

As a result, a motor-vehicle lock and in particular a motor-vehicle door lock is provided, which works in a particularly functional manner. In fact, the locking element can control and specify whether, in the event of a crash, the inertia lever acts on the coupling element only with respect to the external actuating lever or fails overall. Moreover, no additional actuations or levers are required to deactivate the internal actuating lever in any way. Rather, in the unlocked state or with the coupling element in the first coupled state, the associated motor-vehicle door can be opened easily from the inside after the event of a crash. In addition, the event of a crash and the pivoting movement of the inertia lever operate practically exclusively on the external actuating lever, such that the latter is uncoupled in the event of a crash, provided the unlocked state has been assumed. Otherwise, the action thereon, as well as that of the internal actuating lever, is dispensable, with the aid of the inertia lever, so that the functional reliability is additionally increased as a result. Herein lie the essential advantages.

BRIEF DESCRIPTION OF DRAWINGS

The invention is explained in greater detail below with reference to drawings which show only one embodiment. In the drawings.

DETAILED DESCRIPTION

In the figures, a motor-vehicle lock is shown, which is a motor-vehicle door lock. This has a locking mechanism 1, 2, which is only indicated in FIG. 1, consisting essentially of a rotary latch 1 and safety catch 2. The rotary latch 1 and the safety catch 2 are each mounted in a steel lock case 3.

Figure 2A:
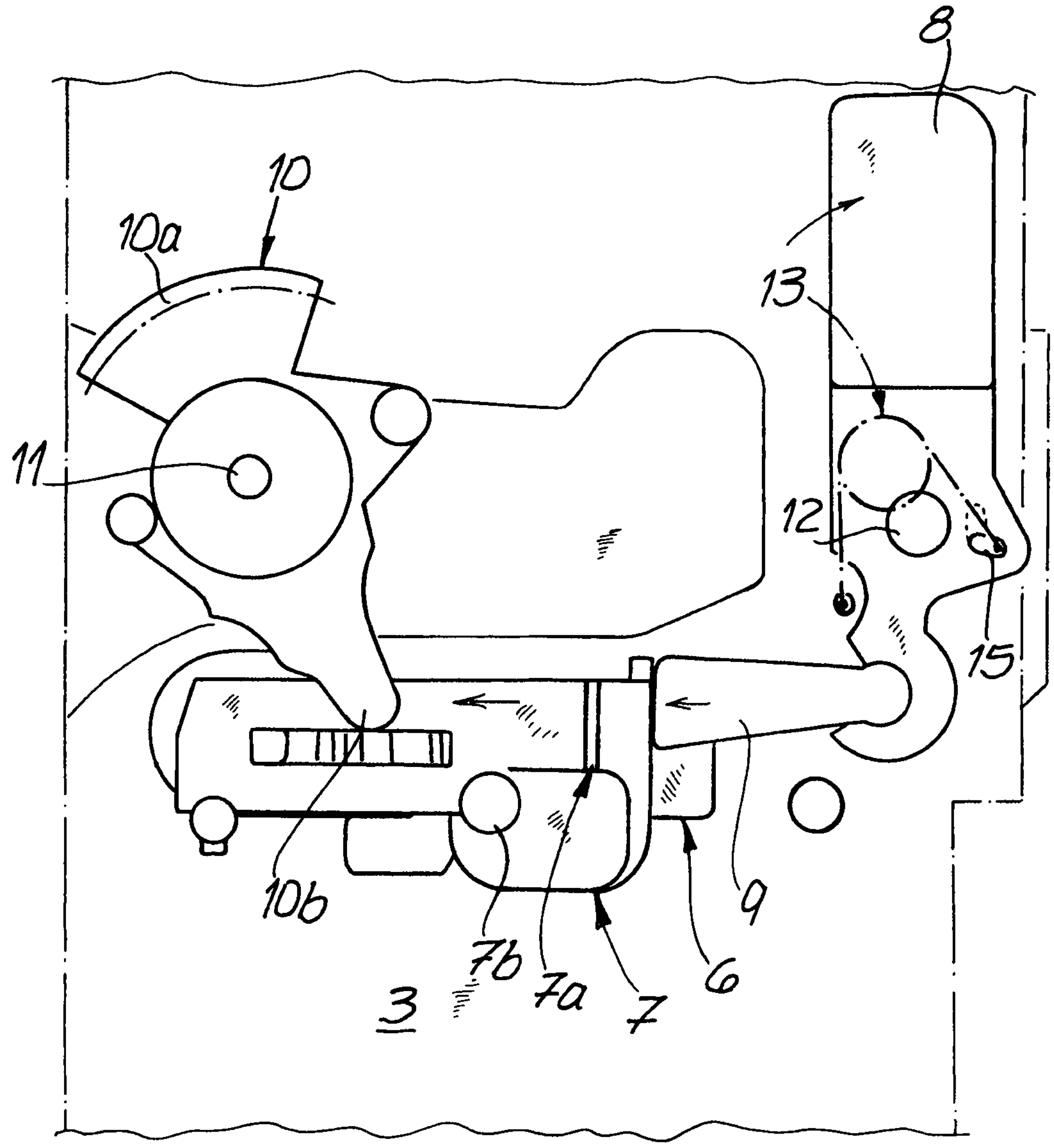
FIG. 2A shows a front view of the motor-vehicle lock according to FIG. 1 in the unlocked state and in the event of a crash.
Figure 2B:
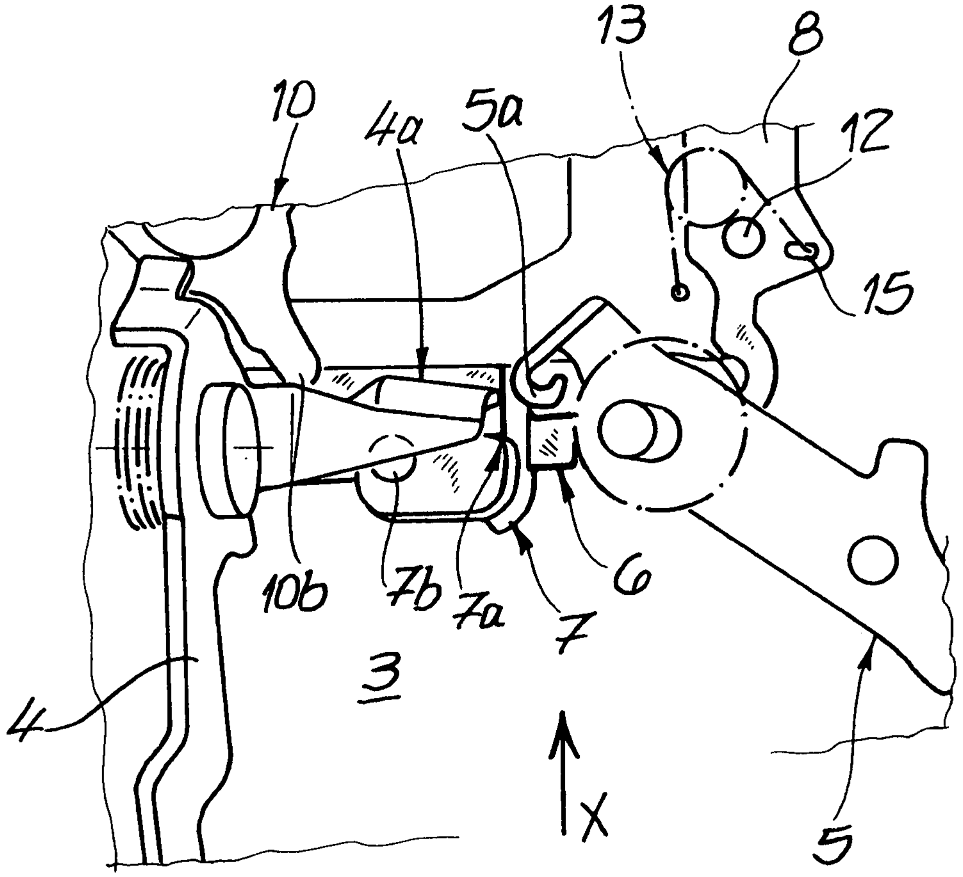
FIG. 2B shows a perspective detail view of the motor-vehicle lock according to FIG. 2A.

The basic structure also includes an internal actuating lever 4, visible in FIG. 2B, and an external actuating lever 5. Furthermore, a release lever 6 and a coupling element 7 are realized. In addition, an inertia lever 8, 9.

Figure 1:
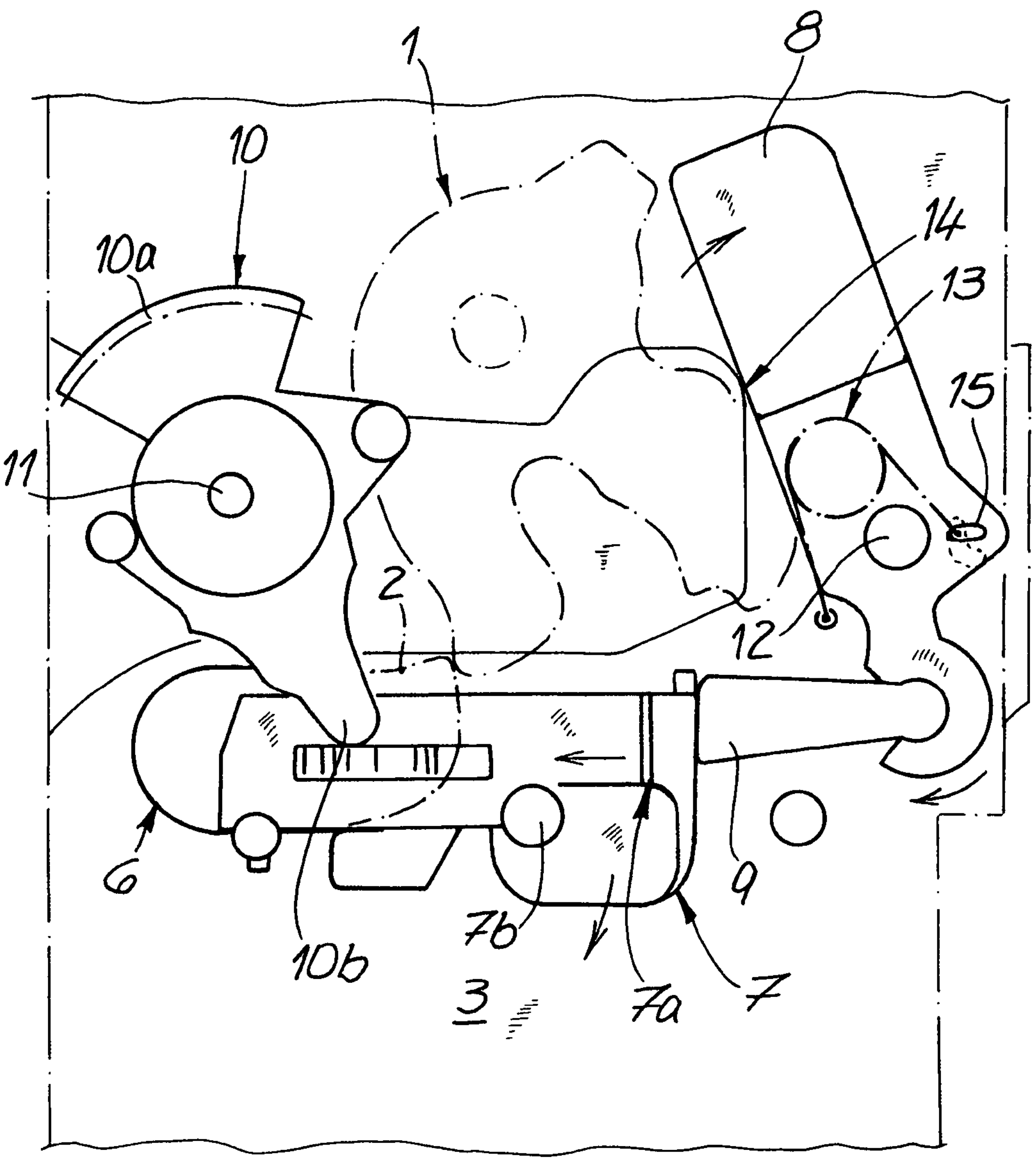
FIG. 1 shows a basic overview of the motor-vehicle lock according to the invention.

The coupling element 7 can be displaced in its longitudinal direction, as indicated by an arrow in FIG. 1. For this purpose, the coupling element 7 according to the embodiment is mounted on the release lever 6 in a linearly displaceable manner. In order to be able to assume the different positions, in the embodiment the coupling element 7 is acted upon by a motor with the aid of a locking element 10. For this purpose, the locking element 10 is designed as an actuating cam which can be pivoted about an axis 11. One end of the locking element 10 is equipped with a toothed ring 10*a* for engaging a motor drive (not shown). The other end of the locking element 10 engages with a joint 10*b* into the coupling element 7 and ensures the described linear displacement of the coupling element 7 relative to the release lever 6.

It can be seen that the inertia lever 8, 9 is formed in two parts overall and has a mass element 8 and an adjusting element 9 coupled in an articulated manner thereto. The mass element 8 is mounted in the lock case 3 such that it can rotate about an axis 12. In addition, a spring 13 is also assigned to the inertia lever 8, 9.

In the normal state shown in FIG. 1, the inertia lever 8, 9 rests with its mass element 8 against a stop 14 of a lock housing. In addition, the coupling element 7 is not acted upon by the adjusting element 9 in this case. If, however, a crash now occurs, as can be reproduced on the basis of FIGS. 2A, 2B and 4, the associated crash accelerations thus ensure that the mass element 8 is pivoted clockwise about its axis 12. This is indicated by a corresponding arrow in FIG. 1. This has the consequence that the adjusting element 9 connected in an articulated manner to the mass element 8 runs into the coupling element 7 and is displaced to the left in the embodiment. The previously mentioned spring 13 engages with one spring leg in a guide opening 15 in the mass element 8, while another spring leg is anchored in a stationary manner in the lock housing or lock case 3. The stop 14 for the inertia lever 8, 9 also ensures that this can be acted on only in the clockwise direction about the axis 12, and not in the counterclockwise direction. In this case, the locking element 10 maintains its position.

The internal actuating lever 4 and also the external actuating lever 5 can each be brought into engagement with the release lever 6 via the coupling element 7 in the coupled position, and disengaged from the release lever 6 in the uncoupled position. For this purpose, the coupling element 7 according to the embodiment is able to be moved, depending on the design of the actuating lever 4, 5, into a first coupled position shown in FIGS. 2A and 3 and into a second coupled position shown in FIGS. 4 and 5. The locking element 10 ensures the respective control in the first coupled position and the second coupled position of the coupling element 7 in each case. In this case, the first coupled position according to FIGS. 2A and 3 corresponds to the "unlocked" position of the locking element 10, whereas the second coupled position according to FIGS. 4 and 5 corresponds to the "locked" position of the locking element 10.

It can be seen that the coupling element 7 has an external actuating lever contour 7*a* and an internal actuating lever contour 7*b*. In this case, the external actuating lever contour 7*a* is provided on the head side of the coupling element 7. In contrast, the internal actuating lever contour 7*b* is a pin 7*b* which adjoins the external actuating lever contour 7*a* internally.

In this case, the design is such that the external actuating lever 5 can interact, via a projection 5*a*, with the external actuating lever contour 7*a* when the coupling element 7 is in its initial position shown in FIG. 1 or the first coupled position according to FIG. 2A, 2B and in the "unlocked" state. This interaction corresponds to the fact that the coupling element 7 and the release lever 6 can perform a pivoting movement, indicated in FIG. 1, about their common axis in the clockwise direction indicated there, which lifts the safety catch 2 from its engagement with the rotary latch 1.

Similar applies to the internal actuating lever contour or the pin 7*b*. In the "unlocked" state or in the first coupled position of the coupling element 7, said contour can interact with a chamfer 4*a* on the internal actuating lever 4. This interaction again takes place in such a way that the internal actuating lever 4 acts on the coupling element 7 in such a way that the coupling element 7, together with the release lever 6, is pivoted in the clockwise direction about the common axis in accordance with the illustration in FIG. 1, and thus the safety catch 2 can be lifted from its rotary latch 1. In both cases, the locking mechanism 1, 2 is opened.

Overall, the design is then furthermore such that in the first coupled position according to FIG. 2A, 2B and in the event of a crash only the external actuating lever 5 is disengaged from the actuating lever 6. That is to say that the crash situation in the first coupled position according to FIG. 2A, 2B having the coupling element 7 located in its right-hand end positions ensures that the inertia lever 8, 9 or the mass element 8 is pivoted clockwise about its axis 12, so that the adjusting element 9 works on the coupling element 7 and displaces this to the left, in the embodiment, with respect to the release lever 6 (see FIG. 1). This has the consequence that, according to the side view according to FIG. 3, the projection 5*a* on the release lever 5 comes out of engagement with the external actuating lever contour 7*a*, and consequently a crash-induced deflection of the external actuating lever 5 cannot work on the coupling lever 7 and thus the release lever 6. The locking mechanism 1, 2 remains closed.

At the same time, in this first coupled position, both in the event of a crash and outside of a crash situation, the internal actuating lever 4 is still engaged with the release lever 6, as before and unchanged, in the first coupled position in question. This is because, in the first coupled position, the chamfer 4*a* on the internal actuating lever 4 can still reach the pin 7*b* on the coupling element 7, even if the adjusting element 9 acts on the coupling lever 7 in the event of a crash.

Figure 4:
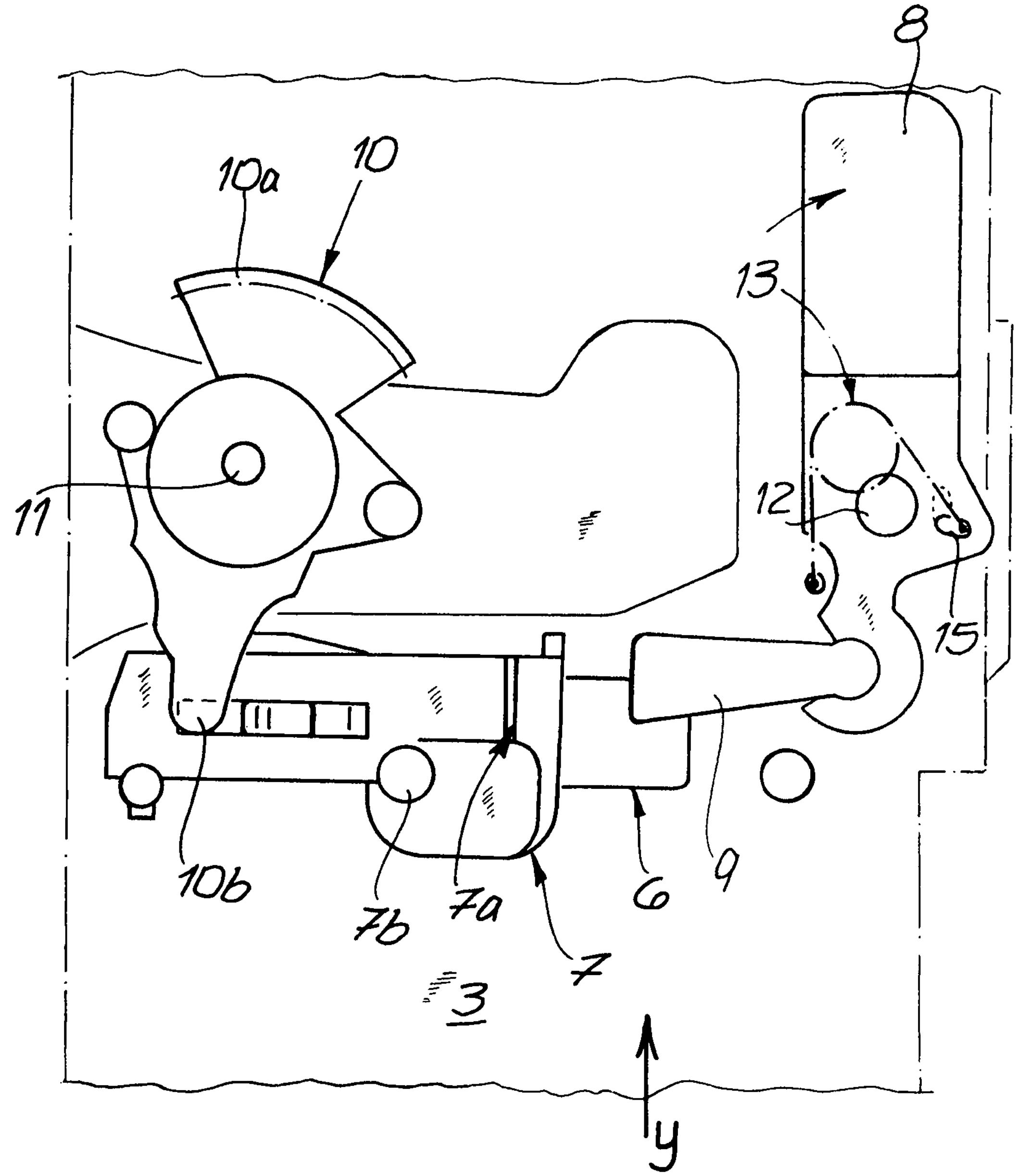
FIG. 4 shows a front view of the motor-vehicle lock according to FIG. 2 in the locked state.
Figure 5:
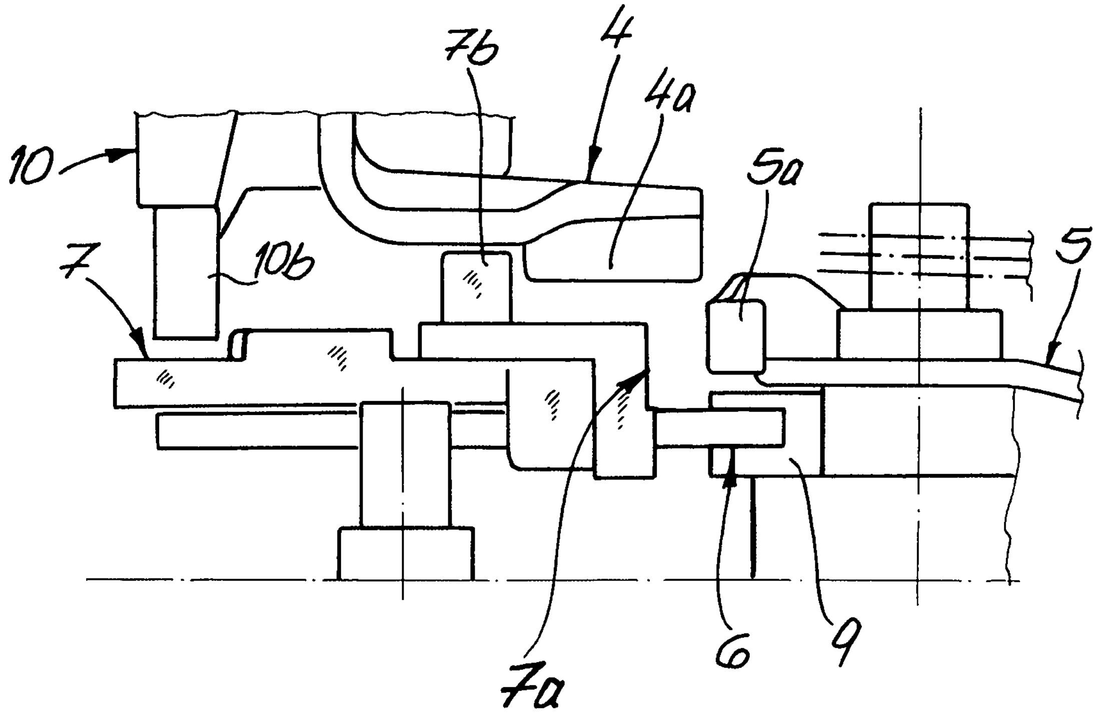
FIG. 5 shows another side view of the subject matter according to FIG. 4, with a viewing direction from the direction Y.

In the second coupled position according to the illustration in FIGS. 4 and 5, however, neither the external actuating lever 5 nor the internal actuating lever 4 are (have to be) disengaged from the release lever 6 in the event of a crash. This is because such a position of the coupling element 7 disengaged from the release lever 6 is already present, because in FIGS. 4 and 5 the coupling element 7 has assumed its second coupled position, i.e. "locked." This corresponds to the position of the coupling element 7 in its left-hand end position, which is displaced further to the left, in the embodiment, relative to the first coupled position according to FIG. 2A. As a result, the pin 7*b* on the coupling element 7 also moves outside the region of action of the chamfer 4*a* on the internal actuating lever 4, so that in this case, in the second coupled position of the coupling element 7 ("locked"), actuation of both the internal actuating lever 4 and the external actuating lever 5 fails.

If in such a case a crash acceleration of the inertia lever 8, 9 occurs, this again ensures that the mass element 8 is pivoted clockwise about its axis 12. However, this clockwise movement of the mass element 8 results in the adjustment element 9 not (any longer) reaching the coupling element 7 in this case, and consequently a free travel of the inertia lever 8, 9 in relation to the coupling element 7 being observed in this case in the second coupled position of the coupling element 7.

Figure 3:
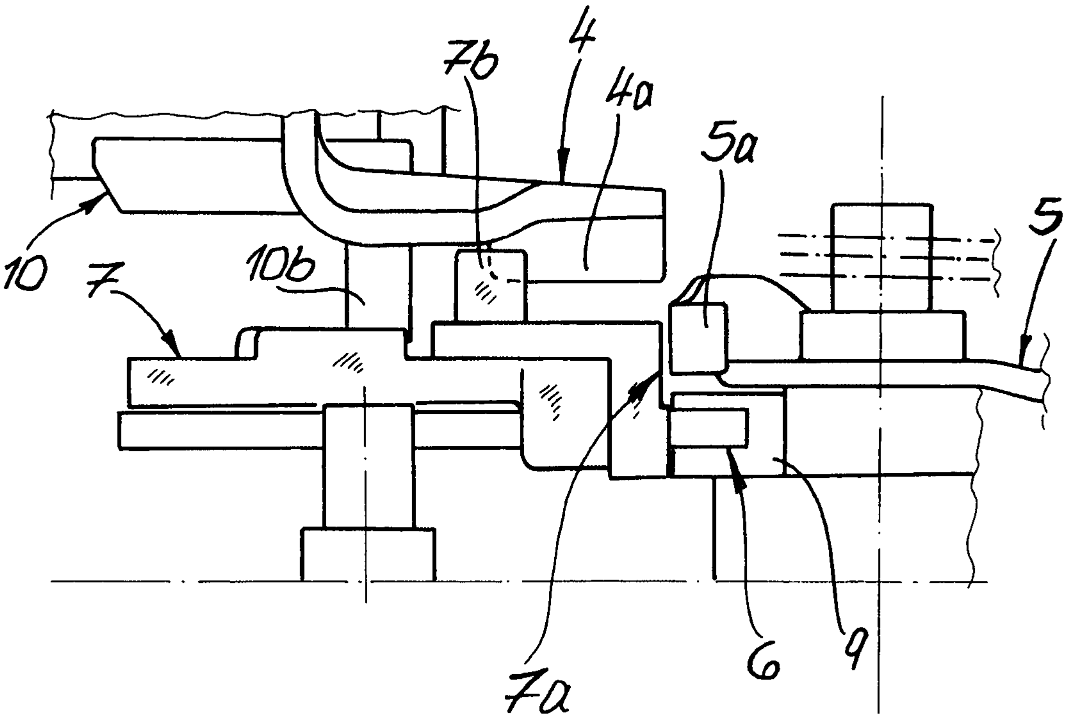
FIG. 3 shows a side view of the motor-vehicle lock according to FIG. 2B from the direction X.

After the crash acceleration has been eliminated, the locking mechanism 1, 2 can consequently be opened directly and unchanged, with the aid of the internal actuating lever 4, in the first coupled position according to FIGS. 2A, 2B and 3. An actuation with the aid of the external actuating lever 5 is then also possible, because the coupling element 7 is moved (spring-assisted) into its right-hand end positions, shown in FIG. 1, or the initial position, after the end of the application on the part of the inertia lever 8, 9. In contrast, after the elimination of the crash acceleration in the embodiment according to FIGS. 4 and 5, it is initially necessary for the coupling element 7 to be first transferred to its unlocked position or first coupled position with the aid of the locking element 10, so that the locking mechanism 1, 2 can subsequently be opened via the internal actuating lever 4 or external actuating lever 5.

List of reference signs

| | | | | | |
|---|---|---|---|---|---|
| 1, 2 | locking mechanism | | | | |
| 1 | rotary latch | | | | |
| 2 | safety catch | | | | |
| 3 | lock case | | | | |
| 4, 5 | actuating lever | | | | |
| 4 | internal actuating lever | 4a | chamfer | | |
| 5 | external actuating lever | 5a | projection | | |
| 6 | release lever | | | | |
| 7 | coupling element | 7a | external actuating lever contour | | |
| | | 7b | internal actuating lever contour/pin | | |
| 8, 9 | inertia lever | | | | |
| 8 | mass element | | | | |
| 9 | adjusting element | | | | |
| 10 | locking element | 10a | toothed ring | 10b | joint |
| 11, 12 | axes | | | | |
| 13 | spring | | | | |
| 14 | stop | | | | |
| 15 | guide opening | | | | |

The invention claimed is:

1. A motor-vehicle lock comprising:

a locking mechanism including a rotary latch and a safety catch, at least one actuating lever and a release lever, a coupling element, wherein by the coupling element, the at least one actuating lever and the release lever are engaged with one another in at least one coupled position of the coupling element and are disengaged from one another in an uncoupled position of the coupling element, and at least one inertia lever for forcing the coupling element into the uncoupled position at least in the event of a crash, wherein the at least one coupled position includes a first coupled position and a second coupled position, and, the coupling element is moved in a controlled manner into the first coupled position versus the second coupled position by the at least one actuating lever.

2. The motor-vehicle lock according to claim 1, wherein the at least one actuating lever comprises an internal actuating lever and an external actuating lever.

3. The motor-vehicle lock according to claim 2, wherein, in the first coupled position of the coupling element and when the coupling element is acted upon by the inertia lever, only the external actuating lever is brought out of engagement with the release lever, while neither the external actuating lever nor the internal actuating lever is brought out of engagement with the release lever in the second coupled position and when the coupling element is acted upon by the inertia lever.

4. The motor-vehicle lock according to claim 1, further comprising a locking element, wherein the first coupled position and the second coupled position of the coupling element are adjusted by the locking element.

5. The motor-vehicle lock according to claim 4, wherein the first coupled position of the coupling element corresponds to an unlocked position of the locking element, and the second coupled position of the coupling element corresponds to a locked position of the locking element.

6. The motor-vehicle lock according to claim 4, wherein the locking element is acted upon by a motor and/or manually.

7. The motor-vehicle lock according to claim 4, wherein the locking element is configured as an actuating cam having a toothed ring for acting on the coupling element.

8. The motor-vehicle lock according to claim 1, wherein the coupling element is mounted on the release lever in a linearly displaceable manner.

9. The motor-vehicle lock according to claim 1, wherein the coupling element has an external actuating lever contour and an internal actuating lever contour.

10. The motor-vehicle lock according to claim 9, wherein the external actuating lever contour is formed on a head side of the coupling element and the internal actuating lever contour is configured as a pin adjoining the internal actuating lever internally; and wherein in the first coupled position the internal actuating lever interacts with the pin and the external actuating lever travels along the head side of the coupling element, and in the second coupled position neither the external actuating lever contour nor the pin are in a region of action of the external actuating lever or the internal actuating lever.

11. The motor-vehicle lock according to claim 2, wherein the first coupled position corresponds to the internal actuating lever being continuously engaged with the release lever and the external actuating lever being disengaged from the release lever.

12. The motor-vehicle lock according to claim 11, wherein the second coupled position corresponds to both the internal actuating lever and the external actuating lever being engaged with the release lever.

13. The motor-vehicle lock according to claim 2, further comprising a locking element, wherein at least one of the coupled positions of the coupling element corresponds to an unlocked position of the locking element in which both the internal actuating lever and the external actuating lever are mechanically connected to the release lever, and the second coupled position of the coupling element corresponds to a locked position of the locking element in which both the internal actuating lever and the external actuating lever are disengaged from the release lever.

14. The motor-vehicle lock according to claim 1, wherein the inertia lever comprises a mass element and adjusting element that is articulated relative to the mass element, and the adjusting element acts on the coupling element during a crash.

* * * * *